US009204346B1

United States Patent
Pawar et al.

(10) Patent No.: US 9,204,346 B1
(45) Date of Patent: Dec. 1, 2015

(54) DYNAMIC CONFIGURATION OF BASE STATION SETTINGS FOR CONTROLLING HANDOVER TO PREFERRED COVERAGE FREQUENCY

(71) Applicant: Sprint Spectrum L.P., Overland Park, KS (US)

(72) Inventors: Hemanth B. Pawar, Brambleton, VA (US); Shilpa Kowdley Srinivas, Brambleton, VA (US); Krishna Sitaram, Chantilly, VA (US); Daniel Vivanco, Sterling, VA (US)

(73) Assignee: Sprint Spectrum L.P., Overland Park, KS (US)

(*) Notice: Subject to any disclaimer, the term of this patent is extended or adjusted under 35 U.S.C. 154(b) by 52 days.

(21) Appl. No.: 14/246,769

(22) Filed: Apr. 7, 2014

(51) Int. Cl.
*H04W 36/30* (2009.01)
*H04W 36/00* (2009.01)

(52) U.S. Cl.
CPC ...... *H04W 36/0083* (2013.01); *H04W 36/0061* (2013.01)

(58) Field of Classification Search
CPC .................................................... H04W 36/30
USPC .................................................. 455/436–438
See application file for complete search history.

(56) References Cited

U.S. PATENT DOCUMENTS

| 7,477,920 | B2 | 1/2009 | Scheinert et al. | |
| 8,331,940 | B2 * | 12/2012 | Kim et al. | 455/436 |
| 2001/0007552 | A1 | 7/2001 | Schiff et al. | |
| 2004/0049699 | A1 | 3/2004 | Griffith et al. | |
| 2009/0203381 | A1 | 8/2009 | Ueda | |
| 2009/0318154 | A1 * | 12/2009 | Lee et al. | 455/438 |
| 2011/0275369 | A1 | 11/2011 | Bartlett et al. | |
| 2013/0045706 | A1 | 2/2013 | Hsu | |
| 2013/0084863 | A1 * | 4/2013 | Zhang et al. | 455/436 |
| 2013/0090124 | A1 | 4/2013 | Panchal et al. | |
| 2013/0273917 | A1 | 10/2013 | Sfar | |

FOREIGN PATENT DOCUMENTS

WO WO 2011/143815 11/2011

OTHER PUBLICATIONS

First Action Interview Pilot Program Pre-Interview Communication from U.S. Appl. No. 13/860,275, dated Apr. 2, 2015.
U.S. Appl. No. 13/860,275, filed Apr. 10, 2013.

* cited by examiner

*Primary Examiner* — Michael T Vu

(57) ABSTRACT

A method to dynamically configure a base station based on evaluation of whether nearby and/or neighboring base stations operate on a preferred coverage frequency. For instance, the base station could be configured to broadcast as a start-scanning threshold value a relatively high value in response to determining that a base station operating on the preferred coverage frequency is located within a predefined threshold distance. Further, the base station could be configured to broadcast as the start-scanning threshold value an intermediate value in response to determining that no nearby base station operates on the preferred coverage frequency but at least one base station that is a handover neighbor operates on the preferred coverage frequency. And the base station could be configured to broadcast as the start-scanning threshold value a relatively low value in response to determining that no nearby base stations or handover neighbors operate on the preferred coverage frequency.

19 Claims, 5 Drawing Sheets

|  | PREFERRED FREQ THRESHOLD CLOSE (E.G., CO-LOCATED) | PREFERRED FREQ NOT THRESHOLD CLOSE, BUT HANDOVER NEIGHBOR | PREFERRED FREQ NOT THRESHOLD CLOSE AND NOT HANDOVER NEIGHBOR |
|---|---|---|---|
| A2 | −80 dBm | −100 dBm | −107 dBm |
| $A5_1$ | −80 dBm | −100 dBm | −110 dBm |
| $A5_2$ | −105 dBm | −110 dBm | −105 dBm |
| A1 | −75 dBm | −97 dBm | −104 dBm |

Fig. 2

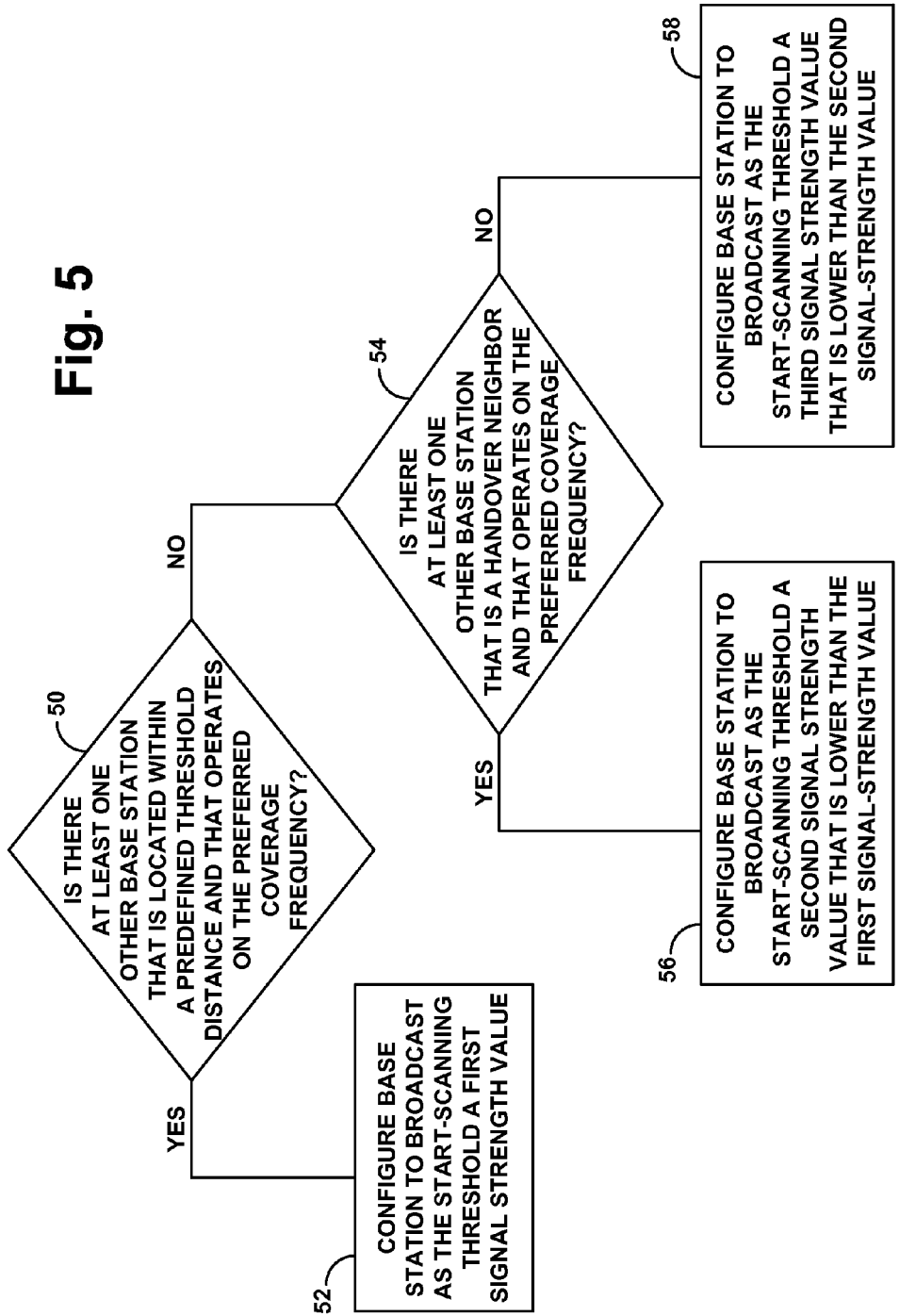

DYNAMIC CONFIGURATION OF BASE STATION SETTINGS FOR CONTROLLING HANDOVER TO PREFERRED COVERAGE FREQUENCY

BACKGROUND

Unless otherwise indicated herein, the materials described in this section are not prior art to the claims and are not admitted to be prior art by inclusion in this section.

A typical cellular wireless network includes a number of base stations each radiating to define a respective coverage area in which wireless communication devices (WCDs) (also known as user equipment devices (UEs), whether or not operated by an end-user), such as cell phones, tablet computers, tracking devices, embedded wireless modules, and other wirelessly equipped communication devices, can operate. (In practice, a given cell site may include an antenna structure and associated equipment that is arranged as multiple such base stations, each radiating to define a respective coverage area.) In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of WCDs, initiation of communications, handoff between coverage areas, and other functions related to air interface communication.

In accordance with the air interface protocol, each base station (and thus each coverage area) may operate on at least one coverage frequency for carrying communications wirelessly between the base station and WCDs. In particular, the air interface between the base station and WCDs may carry communications on one or more particular frequency channels, each defining one or more ranges of radio frequency spectrum within a particular frequency band (or "band class"). As such, the coverage frequency of a base station may be considered to be the one or more frequency channels on which the base station operates and/or the one or more frequency bands in which the base station operates.

The industry defines various frequency bands (or "band classes" (BCs)), some of which may be designated for frequency division multiplex (FDD) use in which uplink and downlink communications occur in different parts of the band, and others of which may be designated for time division duplex (TDD) use in which the uplink and downlink communications share the same frequency over time. Further, in accordance with industry regulations or engineering design, the frequency channels defined in these bands may vary in bandwidth based on the bands in which they are defined and may thus support different speeds of data communication.

By way of example, for LTE service, the industry currently defines BC-25 (at or around 1900 MHz) and BC-26 (at or around 800 MHz) for FDD communication, and the frequency channels provided in these bands may span 5 MHz in each direction, thus supporting up to about 25 Mbps on the downlink. In addition, the industry currently defines BC-41 for TDD communication, and the frequency channels provided in BC-41 may be 20 MHz wide, thus supporting up to about 60 Mbps on the downlink.

Also in accordance with the air interface protocol, the coverage area provided by each base station may define various logical or physical channels (e.g., through frequency division multiplexing, time division multiplexing, orthogonal frequency division multiplexing, and/or code division multiplexing) for carrying certain types of communications between the base station and WCDs. By way of example, on the downlink, the coverage area may define a reference channel for carrying a reference signal that WCDs can monitor as a way to detect and evaluate coverage of the base station, one or more control channels for carrying various system information and control messages to WCDs, and one or more traffic channels such as a shared downlink channel for carrying bearer communication traffic and other data to WCDs. And on the uplink, the coverage area may similarly define one or more control channels for carrying control messages to the base station, and one or traffic channels such as a shared channel for carrying bearer communication traffic and other data to the base station.

Further, a base station and/or associated network infrastructure may maintain a "neighbor list" that indicates other nearby base stations to which WCDs being served by the base station could potentially hand over. Such a neighbor list could specify various information about each such handover neighbor, including for instance as one or more coverage frequencies on which the neighbor operates, a network address of the neighbor, and a geographic location of the neighbor. In practice, such neighbor data could be updated from time to time as changes are made in the configuration of the network, such as when base stations are added, removed, moved, or reconfigured. For instance, the neighbor data could be updated manually by engineering input as changes are made to the network and/or through an automated process as WCDs report various detected neighbors.

In practice, when a WCD is being served by a base station on a particular coverage frequency, the WCD may monitor the reference signal from the base station and may evaluate the signal strength (e.g., signal-to-noise ratio) of that reference signal as a basis to determine when the WCD should begin considering the possibility of handover to another base station, perhaps on another coverage frequency. For instance, the WCD may determine when the reference signal strength from its serving base station falls below a predefined threshold level defined as a start-scanning threshold, at which point the WCD may start to scan for coverage on other coverage frequencies. Further, upon finding such other coverage, the WCD may then also determine when the reference signal strength from its serving base station is below another predefined threshold level (e.g., equal to or lower than the start-scanning threshold) defining a handover threshold at which the WCD may then request handover to a sufficiently strong other base station, at which point the WCD may then engage in signaling with its serving base station to request handover to the other base station.

OVERVIEW

For various reasons, a wireless service provider may prefer that its served WCDs operate on a particular coverage frequency, such as a particular band for instance. By way of example, in a network or region providing some BC-25 coverage, some BC-26 coverage, and some BC-41 coverage, with channel bandwidths as described above for instance, a service provider may desire that its WCDs operate on BC-41 as often as possible, since the BC-41 channels may provide higher throughput and thus better user experience.

One way to help achieve this goal is to set scanning and handover thresholds like those mentioned above to be particular levels that would help foster handover away from a base station that does not operate on the preferred coverage frequency, possibly to a base station that does operate on the preferred coverage frequency. By way of example, continuing with the example above, a base station that does not operate on BC-41 could instruct its served WCDs to apply a relatively high start-scanning threshold so that the served WCDs would more readily (without needing to have as poor coverage) begin scanning for other coverage and might then more readily find and hand over to BC-41 coverage. Likewise, such a base station could instruct its served WCDs to apply a relatively high handover threshold for the serving base station's reference signal, so that the served WCDs would more readily request handover to a sufficiently strong neighbor base station that might provide BC-41 coverage.

A problem with this, however, is that such aggressive thresholds could be counter-productive in an area where the preferred coverage frequency is minimal or non-existent. For instance, if there are few or no nearby or neighboring base stations that operate on the preferred coverage frequency, applying a relatively high start-scanning threshold may cause served WCDs to more often tune away from their serving band to search for other coverage, which may result in lower throughput and reduced battery life. Further, even if such scanning results in ultimately triggering handover, in the example situation, the handover would most likely not be to the preferred coverage frequency.

Further, as noted above, cellular wireless networks may change from time to time, with base stations being added, removed, moved, or reconfigured. For instance, as a wireless service provider upgrades or enhances its network to implement the preferred coverage frequency in more and more locations, base stations that once did not operate on the preferred coverage frequency may be reconfigured to operate on the preferred coverage frequency, and neighbor lists may be revised accordingly. Consequently, depending on the changing configuration of a network, there may be some times when it would be helpful to apply such aggressive thresholds and other times when it would be unhelpful and perhaps counter-productive to do so.

Disclosed herein is an improved method and system to help overcome this issue. In accordance with the disclosure, one or more threshold such as those noted above will be dynamically set for a base station that does not operate on the preferred coverage frequency, based on a consideration of (i) whether there is at least one other base station that is located sufficiently nearby and that operates on the preferred coverage frequency and (ii) whether the base station has at least one handover neighbor that operates on the preferred coverage frequency. In particular, the base station will be dynamically configured to broadcast to its served WCDs an indication of one or more such threshold levels set based on such considerations. Consequently, the WCDs served by the base station will then apply the indicated thresholds, to thereby control functions such as when to start scanning for other coverage and when to request handover.

For instance, in a situation where there is at least other base station that is located within a predefined threshold distance of the base station at issue (e.g., co-located with the base station, or threshold close to the base station) and that operates on the preferred coverage frequency, the disclosed method and system may provide for setting relatively high start-scanning and handover thresholds for the serving reference signal, to help promote scanning and handover to that other base station. Whereas, if there is no other base station that is located within the predefined threshold distance of the base station at issue and that operates on the preferred coverage frequency but there is at least one base station that is a handover neighbor of the base station at issue and that operates on the preferred coverage frequency, then the disclosed method and system may provide for setting medium level start-scanning and handover thresholds for the serving reference signal. And if there is no other base station that is located within the predefined threshold distance of the base station at issue and that operates on the preferred coverage frequency and there is also no other base station that is a handover neighbor of the base station at issue and that operates on the preferred coverage frequency, then the disclosed method and system may provide for setting relatively low start-scanning and handover thresholds for the serving reference signal, to reduce the occurrence of scanning and handover from the serving base station.

This method could be carried out by any of a variety of entities, including for instance the base station itself or perhaps a network controller such as a mobility management entity (MME), base station controller (BSC), or mobile switching center (MSC). Further, the method can be carried out automatically whenever a change in network configuration occurs, such as when neighbor list data changes and/or when base stations are added, removed, moved, or otherwise reconfigured. Thus, as a network configuration changes, the thresholds in effect at particular base stations that do not operate on the preferred coverage frequency could be dynamically changed to help promote handover to the preferred coverage frequency.

Accordingly, in one respect, disclosed is a computing system for dynamically configuring a particular base station to broadcast at least one setting for controlling handover to a preferred coverage frequency on which the particular base station does not operate, where the at least one setting includes a start-scanning threshold that defines downlink receive signal strength, from the particular base station, at which a device served by the particular base station will begin inter-frequency scanning.

In accordance with the disclosure, the computing system may include a processing unit, data storage, and program instructions stored in the data storage and executable by the processing unit to determine a configuration state of the network, to select, based on the determined configuration state, a signal strength value for the particular base station to broadcast as the start-scanning threshold, and to configure the particular base station to broadcast the selected signal strength value as the start-scanning threshold.

In line with the discussion above, the function of determining the configuration state of the network may involve determining which of at least the following three mutually exclusive configurations exists in the network:

(A) there is at least one other base station that is located within a predefined threshold distance of the particular base station and that operates on the preferred coverage frequency, (B) there is no other base station that is located within the predefined threshold distance of the particular base station and that operates on the preferred coverage frequency, but there is at least one other base station that is a handover neighbor of the particular base station and that operates on the preferred coverage frequency, and (C) there is no other base station that is located within the predefined threshold distance of the particular base station and that operates on the preferred coverage frequency, and there no other base station that is a handover neighbor of the particular base station and that operates on the preferred coverage frequency.

In turn, the function of selecting the signal strength value for the particular base station to broadcast as the start-scanning threshold may involve selecting a different signal strength value depending on which of those configurations is determined to exist in the network. In particular, the computing system may be arranged such that, (i) if the determination is that configuration A exists in the network, then the computing system would select as the start-scanning threshold a first signal strength value, (ii) if the determination is that configuration B exists in the network, then the computing system would select as the start-scanning threshold a second signal strength value lower than the first signal strength value, and (iii) if the determination is that configuration C exists in the network, then the computing system would select as the start-scanning threshold a third signal strength value lower than the second signal strength value.

In another respect, disclosed herein is a method of dynamically configuring a particular base station to broadcast at least one setting for controlling handover to a preferred coverage frequency on which the particular base station does not operate, where the at least one setting includes a start-scanning threshold that defines downlink receive signal strength, from the particular base station, at which a device served by the particular base station will begin inter-frequency scanning.

In accordance with the disclosure, the method may involve a computing system making a determination, based on an evaluation of network configuration data, of which one of the above-three three configurations exists in the network. And the method may then involve configuring the particular base station to broadcast a particular start-scanning threshold value selected based on which configuration is determined to exist in the network. In particular, if the determination is that configuration A exists in the network, then the method may involve the computing system responsively configuring the particular base station to broadcast as the start-scanning threshold a first signal strength value. Whereas, if the determination is that configuration B exists in the network, then the method may involve the computing system instead responsively configuring the particular base station to broadcast as the start-scanning threshold a second signal strength value lower than the first signal strength value. And if the determination is that configuration C exists in the network, then the method may involve the computing system instead responsively configuring the particular base station to broadcast as the start-scanning threshold a third signal strength value lower than the second signal strength value.

Still further, in still another respect, disclosed is a method for dynamically configuring a particular base station to broadcast at least one setting for controlling handover to a preferred coverage frequency on which the particular base station does not operate, where the at least one setting includes a start-scanning threshold that defines downlink receive signal strength, from the particular base station, at which a device served by the particular base station will begin inter-frequency scanning.

In accordance with the disclosure, the method may involve making a first determination of whether there is at least one other base station that is located within a predefined threshold distance of the particular base station and that operates on the preferred coverage frequency. In turn, if the first determination is positive, then the method m ay involve responsively configuring the particular base station to broadcast as the start-scanning threshold a first signal strength value. Whereas, if the first determination is negative, then the method may involve making a second determination of whether there is at least one other base station that is a handover neighbor of the particular base station and that operates on the preferred coverage frequency. If the second determination is positive, then the method may then involve responsively configuring the particular base station to broadcast as the start-scanning threshold a second signal strength value that is lower than the first signal-strength value. Whereas if the second determination is negative, then the method may involve responsively configuring the particular base station to broadcast as the start-scanning threshold a third signal strength value that is lower than the second signal-strength value.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 2 is table depicting example threshold values in accordance with an implementation of the present method.

FIG. 5 is another flow chart depicting functions that can be carried out in accordance with an implementation of the present method.

DETAILED DESCRIPTION

Figure 1:
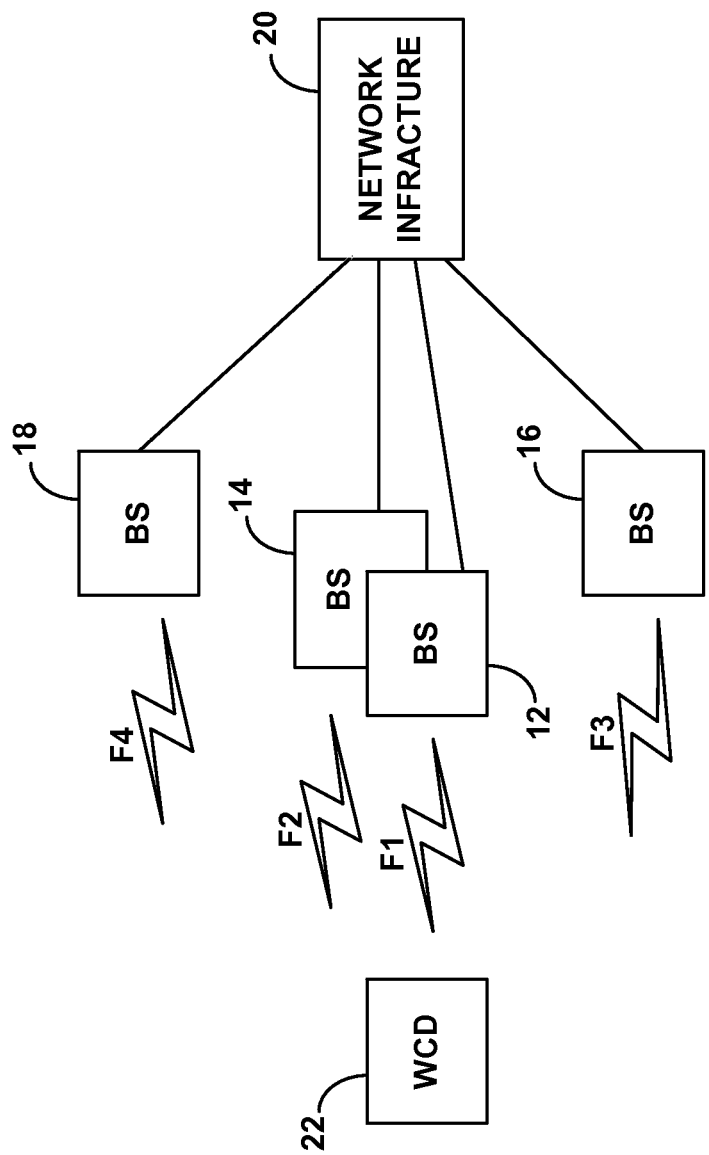
FIG. 1 is a simplified block diagram of a network arrangement in which the present method can be implemented.

Referring to the drawings, as noted above, FIG. 1 is a simplified block diagram of an example network arrangement including a number of base stations each operating on a respective coverage frequency. In particular, the example arrangement includes one base station 12 operating on coverage frequency F1, another base station 14 operating on coverage frequency F2, another base station 16 operating on coverage frequency F3, and another base station 18 operating on coverage frequency F4. For purposes of this description, the terms "F1", "F2", "F3", and "F4" are merely labels designating the coverage frequencies of the illustrated base stations. As such, the use of different labels does not necessarily connote differences in the designated coverage frequencies. In practice, some of the designated coverage frequencies may be different than others, or all of the designated coverage frequencies may be the same as each other. Further, although each base station is shown operating on just one coverage frequency, in practice a representative base station might be arranged to operate on multiple coverage frequencies.

In line with the discussion above, the coverage frequency of each illustrated base station could be considered to take various forms for purposes of the present method. By way of example, the coverage frequency of each base station could be a particular frequency band, such as one of the band classes described above for instance. Alternatively or additionally, the coverage frequency of each base station could be a particular frequency channel defined within such a band. Other examples are also possible.

In the arrangement shown in FIG. 1, the base stations may also take various forms, the specific details of which are not critical, and the base stations may differ in form from each other. By way of example, a representative base station may be a macro base station of the type commonly provided by a cellular wireless service provider for covering a broad area, typically including an antenna structure mounted on top of a tower or other structure. As another example, a representative base station may be a small-cell base station, such as a femtocell or picocell for instance, which typically has a smaller form factor and lower-power components for use to cover a smaller area than a typical macro base station.

In the arrangement shown, base stations 12 and 14 are co-located with each other. In practice, these base stations may be co-located with each other by having their antenna structures at largely the same geographic location (within a defined tolerance, for instance). In one example implementation, for instance, a single cell site could be arranged to define these two base stations with separate antenna structures on a common antenna tower or other base structure. Alternatively, a single physical base station (possibly with a single antenna structure) that provides service separately on coverage frequency F1 and coverage frequency F2 could be considered to define the two separate base stations 12 and 14, one operating on coverage frequency F1 and the other operating on coverage frequency F2.

Base stations 16 and 18, on the other hand, are shown being located at some distances from base stations 12 and 14. In particular, the antenna structure of base station 16 may be located at a geographic location that is some non-zero distance from the antenna structure(s) of base stations 12 and 14, and the antenna structure of base station 18 may likewise be located at a geographic location that is some non-zero distance from the antenna structure(s) of base stations 12 and 14.

In the example arrangement, base stations 12, 14, 16, and 18 are shown communicatively linked with common network infrastructure 20, which could be arranged to carry out aspects of the present method. In practice, network infrastructure 20 could be a network controller and/or an aggregation point, which may also function to provide or facilitate connectivity with one or more transport networks such as the PSTN or a packet-switched network. Alternatively, the network infrastructure could take other forms and serve other purposes or could be provided specifically for purposes of facilitating the present method.

In addition, shown being served by base station 12 on coverage frequency F1 is a representative WCD 22. The WCD may be one of the types of devices noted above. Further, the WCD is optimally arranged to be able to operate on any of various coverage frequencies. For instance, if the coverage frequencies are bands such as those noted above, the WCD may be a multi-band device, including one or more radios and associated components for being served on various ones of such bands. In the specific example discussed above, the WCD may be a tri-band device arranged to support operation on bands BC-25, BC-26, and BC-41.

In practice, the arrangement shown in FIG. 1 may exist at a particular moment in time. As noted above, the configuration of the network may change over time, as base stations are added, removed, modified, or reconfigured. Thus, at a particular moment in time, base stations 12 and 14 may be co-located with each other, base stations 16 and 18 may each be located at some non-zero distances from base stations 12 and 14, and the base stations may be configured to operate on the coverage frequencies shown. Further, the present method could be carried out in response to detecting one or more changes in the network resulting in this configuration, such as in response to input indicating implementation of one or more such changes, and/or in response to otherwise detecting the occurrence of one or more such changes and/or the resulting configuration.

To facilitate carrying out the present method, each base station and/or the network infrastructure may maintain or have access to data indicating the configuration of the network. This configuration data my include location data indicating the geographic location of each base station, as determined through GPS location determination and/or through manual entry, and may specify the operating coverage frequency of each base station. Further, the configuration data may include neighbor list data that specifies neighbor relationships between various base stations. In practice, for instance, the neighbor list data may include a neighbor list respectively for each base station, specifying neighboring base stations to which WCDs served by the base station could potentially hand over. As noted above, such a neighbor list may specify various information about each neighbor, such as the geographic location of the neighbor and the operating coverage frequency of the neighbor.

In practice, each such base station may be arranged to broadcast a system information message that specifies one or more thresholds for use by served WCDs to control when the WCDs would begin inter-frequency scanning and when the WCDs would request handover. By way of example, these thresholds may include the start-scanning and handover thresholds described above, among other thresholds. In an LTE network, specifically, the start-scanning threshold for the serving reference signal strength is known as the "A2" threshold, and the handover threshold for the serving reference signal strength is known as the "$A5_1$" threshold. Further, LTE defines an "$A5_2$" threshold for reference signal strength from a target base station, so that, to trigger a request for handover to the target, a WCD may need to detect serving signal strength at least as low as $A5_1$ and target signal strength at least as high as $A5_2$. In addition, LTE defines an "A1" threshold for reference signal strength sufficient to stop inter-frequency scanning, so that, once a WCD begins inter-frequency scanning, the WCD would stop that scanning if the serving reference signal strength is at least as high as A1.

When a WCD is served by a particular base station, such as when the WCD starts being served by the base station, the WCD may programmatically receive the read the system information message broadcast by the base station, to determine the thresholds that the WCD should apply, and the WCD may then apply those determined thresholds. For instance, in an LTE network, a WCD may receive from its serving base station a system information message that specifies the A2, $A5_1$, $A5_2$, and A1 thresholds, and the WCD may then apply those thresholds while served by the base station, to determine when to start inter-frequency scanning and when to request handover.

As discussed above, the present method addresses a scenario where a particular base station does not operate on a preferred coverage frequency, and the method provides for dynamically configuring the base station to broadcast at least one setting, such as a particular value as one of the thresholds noted above, to help manage handover to the preferred coverage frequency. In practice, the method could be carried out by a computing system, which could be provided as part of the base station at issue and/or by the network infrastructure or other entity remote from the base station at issue.

If the method is carried out by a computing system that is part of the base station itself, the method may result in that computing system dynamically configuring the base station to set one or more of the thresholds at particular values, so that the base station would broadcast the one or more thresholds accordingly. Whereas, if the method is carried out by a computing system that is remote from the base station but that is in network communication with the base station, the method may result in the computing system transmitting to the base station a control signal that directs the base station to set one or more of the thresholds at particular values, and the base station may receive and respond to that control signal by setting the one or more thresholds accordingly, so that the base station would then broadcast those one or more thresholds accordingly.

For simplicity, but without limitation, the remainder of this description will focus on a simplified example where the computing system is provided at the network infrastructure 20, the base station at issue is base station 12, and the preferred coverage frequency is BC-41, and where base station 12 does not operate on BC-41. Further, the description will focus on the example thresholds A2 and $A5_1$ as discussed above. At issue is thus what values base station 12 should broadcast as these thresholds to help promote handover to BC-41. The computing system may carry out the present method to set these thresholds automatically in response to the computing system detecting a change in the set of base stations neighboring and/or located within the vicinity of base station 12, such as an addition, removal, moving, or change in coverage frequency of any such base station. The computing system may learn of such changes from reports transmitted automatically by the base stations to the computing system, such as through registration messages when base stations first power on, through automated neighbor relation processes, or through other means.

As discussed above, the determination of what values base station 12 should broadcast as the thresholds may be made based on an evaluation of the following factors: (i) whether there is at least one base station located within a predefined threshold distance of base station 12 that operates on the preferred coverage frequency, BC-41 in the present example, and (ii) whether base station 12 has at least one handover neighbor, e.g., on its neighbor list, that operates on the preferred coverage frequency.

To determine the distance of each of various BC-41 base stations from base station 12, the computing system may compute a geometric distance between the geographic location of base station 12 and the geographic location of any other base station that operates on BC-41. For instance, the computing system may consult location-data to determine locations of one or more other base stations that operate on BC-41 and may then determine whether a location of any of the one or more other base stations is within the predefined threshold distance of a location of base station 12.

Further, to determine whether a base station is a handover neighbor of base station 12 and perhaps further whether such a base station operates on BC-41, the computing system may review the latest neighbor data such as the latest neighbor list of base station 12. For instance, the computing system may consult neighbor list data that specifies neighbor relationships between base stations and that specifies operating coverage frequencies of base stations, and the computing system may determine from the neighbor list data whether there is at least one other base station that neighbors base station 12 and that operates on BC-41.

In practice, the computing system may be arranged to set one or more of the thresholds at relatively higher or lower values based on consideration of these factors.

For example, if the computing system determines that there is at least one base station that is located within a threshold distance of base station 12 (e.g., co-located with base station 12 or within some other predefined non-zero threshold distance from base station 12) and that is operating on BC-41, then the computing system may set the A2 and $A5_1$ thresholds at relatively high levels (possibly the same as each other), to help cause served WCDs to more readily start inter-frequency scanning and request handover to a sufficiently strong target base station. This may account for a scenario where a base station providing BC-41 service is co-located with base station 12 or is otherwise very near to base station 12, in which case it may be most desirable to have a WCD served by base station 12 scan for BC-41 coverage and hand over to that other base station.

Whereas, if the computing system determines that there is no other base station that is located within he predefined threshold distance of base station 12 and that is operating on BC-41, but that there is at least one other base station that is a handover neighbor of base station 12 (e.g., on a neighbor list designating it and base station 12 as neighbors for possible WCD handover) and that operates on BC-41, then the computing system may set the A2 and $A5_1$ thresholds to somewhat lower levels. This may account a scenario where there is a base station that is relatively far away from base station 12 but that provides BC-41 coverage overlapping with coverage provided by base station 12, in which case it may still be somewhat desirable to foster handover, but perhaps not as desirable as if the base station was much closer to base station 12.

And if the computing system determines that there is no other base station that is located within the predefined threshold distance of base station 12 and that operates on BC-41 and that there is no other base station that is a handover neighbor of base station 12 and that operates on BC-41, then the computing system may set the A2 and $A5_1$ thresholds to still lower levels, to help limit the extent of inter-frequency scanning and handover. This may account for a scenario where there is no known BC-41 coverage to which WCDs served by base station 12 could hand over, in which case it may be better to have the WCDs not as readily scan for and request handover.

Thus, depending on the locations and coverage frequencies in the arrangement shown in FIG. 1, the computing system may configure base station 12 with different values to broadcast as thresholds A2 and $A5_1$. For instance, if coverage frequency F2 of co-located base station 14 is BC-41, then the computing system may responsively set the A2 and $A5_1$ thresholds at the relatively high levels. Further, if base station 14 does not operate on BC-41, but the coverage frequency F3 of base station 16 is BC-41 and base station 16 is threshold close to base station 12, then the computing system may responsively set the A2 and $A5_1$ thresholds at the relatively high levels too. Whereas, if base station 14 does not operate on BC-41 and base stations 16 and 18 are not threshold close to base station 12, but if base station 18 is on the neighbor list of base station 12 and the coverage frequency F4 of base station 18 is BC-41, then the computing system may responsively set the A2 and $A5_1$ thresholds at the intermediate level. And if none of the base stations shown in FIG. 1 operate on BC-41, then the computing system may responsively set the A2 and $A5_1$ thresholds at the relatively low levels.

FIG. 2 is a table illustrating specific examples of the values that the computing system may set for the A2 and $A5_1$ thresholds, as well as for the $A5_2$ and A1 thresholds, depending on the circumstances. The values shown in this table are in units of dBm, and thus the larger negative values represent lower measures of signal strength. Accordingly, referring to the table, the computing system may set the A2 threshold at a relatively high value of −80 dBm if at least one other base station is threshold close and operates on BC-41. Whereas, the computing system may set the A2 threshold at an intermediate value of −100 dBm if no BC-41 base station is threshold close but at least one is a handover neighbor of base station 12. And the computing system may set the A2 threshold at a relatively low value of −107 dBm if no BC-41 base station is threshold close to the base station 12 and no BC-41 base station is a handover neighbor of base station 12.

Figure 3:
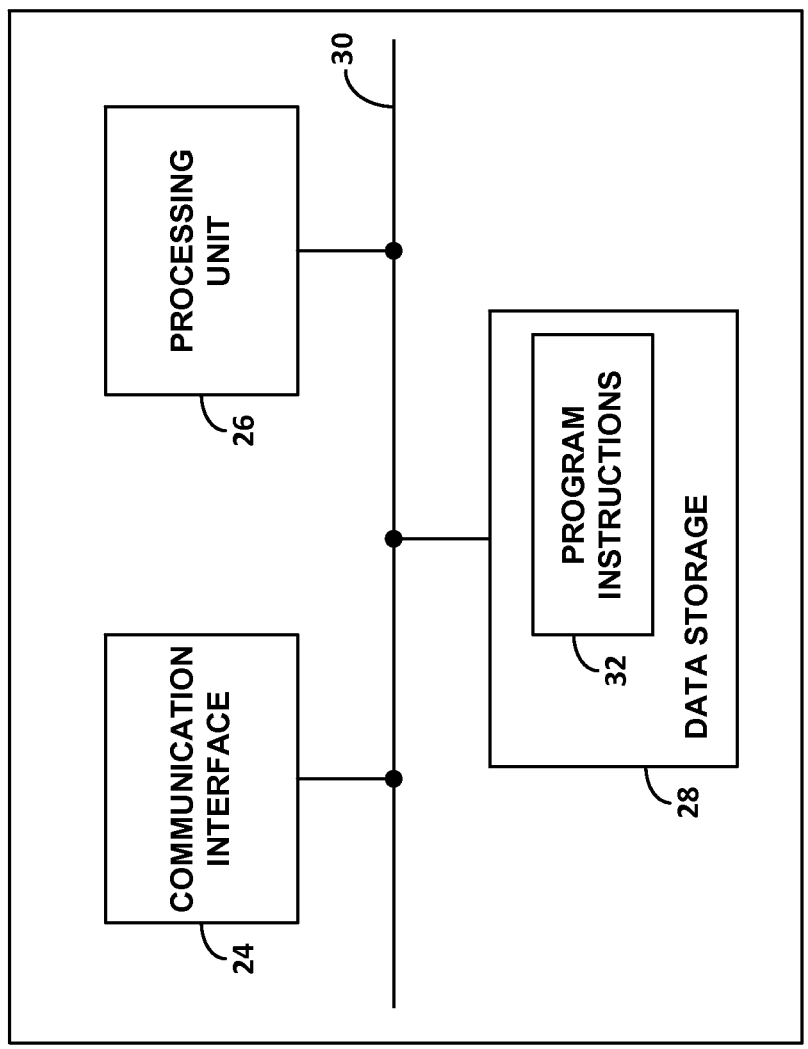
FIG. 3 is a simplified block diagram of a computing system for carrying out the present method.

FIG. 3 is next a simplified block diagram of an example computing system, showing components that may be included in such a system to carry out this method. As shown, the computing system includes a communication interface 24, a processing unit 26 and data storage 28, all of which may be integrated together or interconnected by a system bus, network, or other communication mechanism 30.

Communication interface 24 may be a network interface through which to engage in network communication, such as to receive reports of changes in network configuration, and to transmit to base station 12 a directive for the base station to broadcast certain threshold values. Processing unit 26 may then comprise one or more general purpose processors (e.g., microprocessors) and/or one or more special purpose processors (e.g., application specific integrated circuits). And data storage 28 may comprise one or more volatile and/or non-volatile storage components, such as magnetic, optical, or flash storage.

As shown, data storage in the example computing system stores program instructions 32 that are executable by the processing unit 26 to carry out various functions of the present method. Thus, in an example implementation, the program instructions may be executable by the processing unit to determine a configuration state of the network, to select, based on the determined configuration state, a signal strength value for the particular base station to broadcast as the start-scanning threshold, and to configure base station 12 to broadcast the selected signal strength value as the start-scanning threshold.

In line with the discussion above, the program instructions may thus be executable by the processing unit to determine the configuration state of the network by determining which of at least the following three mutually exclusive configurations exists in the network:

(A) there is at least one other base station that is located within a predefined threshold distance of base station 12 and that operates on the preferred coverage frequency, (B) there is no other base station that is located within the predefined threshold distance of base station 12 and that operates on the preferred coverage frequency, but there is at least one other base station that is a handover neighbor of base station 12 and that operates on the preferred coverage frequency, and (C) there is no other base station that is located within the predefined threshold distance of base station 12 and that operates on the preferred coverage frequency, and there no other base station that is a handover neighbor of base station 12 and that operates on the preferred coverage frequency.

Further, the program instructions may be executable by the processing unit to select the signal strength value for the particular base station to broadcast as the start-scanning threshold as follows: (i) if the determination is that configuration A exists in the network, then the processing unit would select as the start-scanning threshold a first signal strength value, (ii) if the determination is that configuration B exists in the network, then the processing unit would select as the start-scanning threshold a second signal strength value lower than the first signal strength value, and (iii) if the determination is that configuration C exists in the network, then the processing unit would select as the start-scanning threshold a third signal strength value lower than the second signal strength value.

In turn, the program instructions may be executable by the processing unit to configure base station 12 to broadcast the selected signal strength value as the start-scanning threshold, by causing the computing system to transmit via the communication interface to base station 12 a directive that base station 12 is programmed to receive and respond to by setting and broadcasting the indicated start-scanning threshold value accordingly. Thus, the base station may set the selected signal strength value as the start-scanning threshold in a system information message that the base station periodically broadcasts for receipt by served WCDs.

Figure 4:
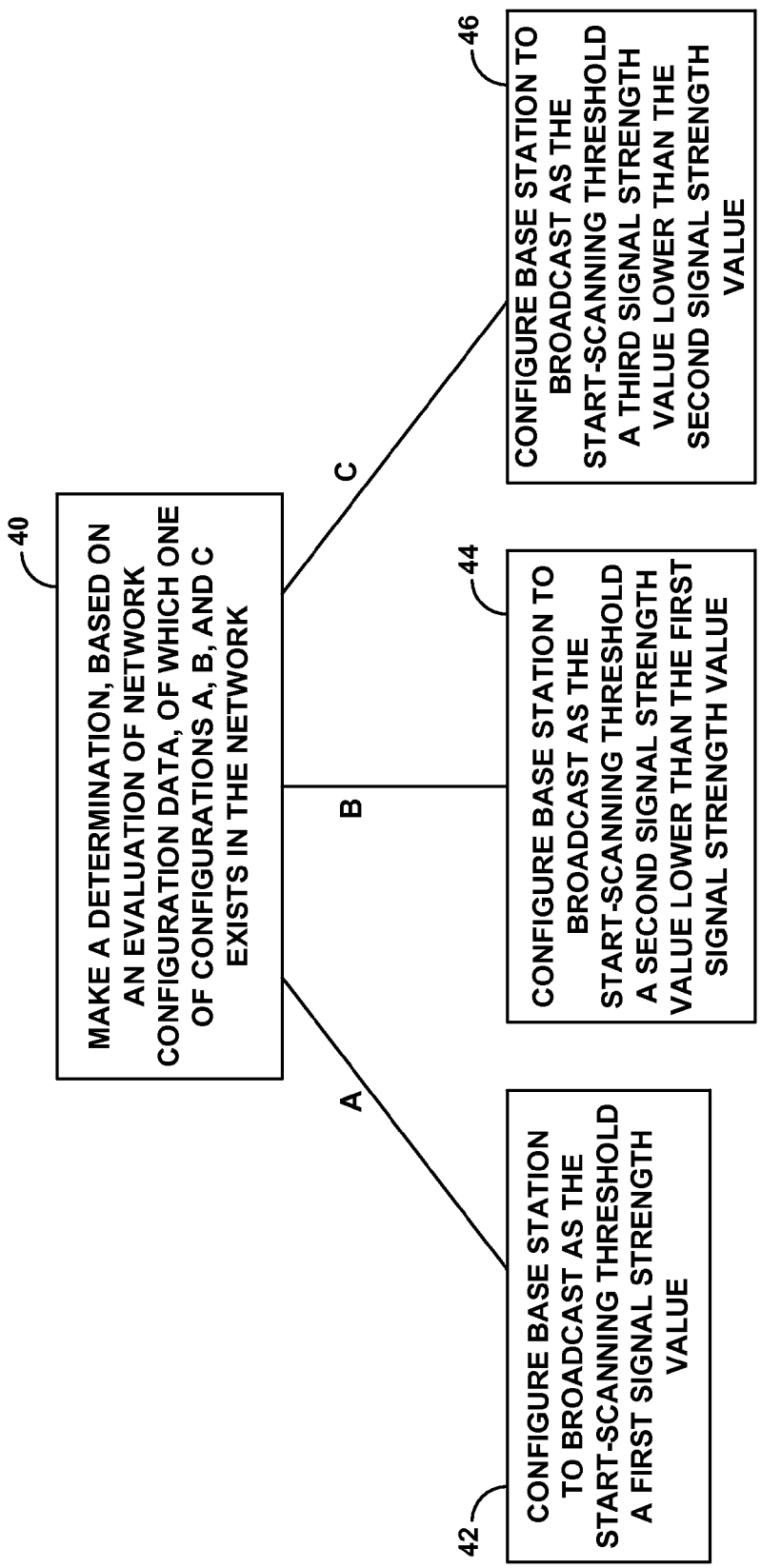
FIG. 4 is a flow chart depicting functions that can be carried out in accordance with an implementation of the present method.

FIG. 4 is next a flow chart depicting functions that can be carried out by a computing system in accordance with the present method, to configure base station 12 to broadcast at least one setting for controlling handover to a preferred coverage frequency on which base station 12 does not operate, where the at least one setting includes a start-scanning threshold that defines downlink receive signal strength, from base station 12, at which a device served by base station 12 will begin inter-frequency scanning.

As shown in FIG. 4, at block 40, the method involves the computing system making a determination, based on an evaluation of network configuration data, of which one of configurations A, B, and C as listed above exists in the network. If the determination is that configuration A exists in the network, then, at block 42, the method involves the computing system responsively configuring base station 12 to broadcast as the start-scanning threshold a first signal strength value. Whereas, if the determination is that configuration B exists in the network, then, at block 44, the method involves the computing system responsively configuring base station 12 to broadcast as the start-scanning threshold a second signal strength value lower than the first signal strength value. And if the determination is that configuration C exists in the network, then, at block 46, the method involves the computing system responsively configuring base station 12 to broadcast as the start-scanning threshold a third signal strength value lower than the second signal strength value.

Finally, FIG. 5 is another flow chart depicting functions that can be carried out in accordance with the present method, similarly to dynamically configure base station 12 to broadcast at least one setting for controlling handover to a preferred coverage frequency on which base station 12 does not operate, where the at least one setting includes a start-scanning threshold that defines downlink receive signal strength, from base station 12, at which a device served by base station 12 will begin inter-frequency scanning.

As shown in FIG. 5, at block 50, the method involves making a first determination of whether there is at least one other base station that is located within a predefined threshold distance of base station 12 and that operates on the preferred coverage frequency. If the first determination is positive, then, at block 52, the method involves responsively configuring base station 12 to broadcast as the start-scanning threshold a first signal strength value. Whereas, if the first determination is negative, then, at block 54, the method involves responsively making a second determination of whether there is at least one other base station that is a handover neighbor of base station 12 and that operates on the preferred coverage frequency. In turn, if the second determination is positive, then, at block 56, the method involves responsively configuring base station 12 to broadcast as the start-scanning threshold a second signal strength value that is lower than the first signal-strength value. Whereas, if the second determination is negative, then, at block 58, the method involves responsively configuring base station 12 to broadcast as the start-scanning threshold a third signal strength value that is lower than the second signal-strength value.

Further, although the illustrated method focuses on dynamically setting the start-scanning threshold, a similar process may be applied with respect to other thresholds, such as the other types of thresholds shown in FIG. 2. For instance, the method may also include setting a first handover threshold such as $A5_1$. In particular, if the first determination is positive, then the method may involve responsively configuring base station 12 to broadcast as the first handover threshold a fourth signal strength value (which could be the same as or perhaps lower than the first signal strength value). Whereas, if the first determination is negative and the second determination is positive, then the method may involve responsively configuring base station 12 to broadcast as the first handover threshold a fifth signal strength value that is lower than the fourth signal-strength value. And if the first determination is negative and the second determination is negative, then the method may involve configuring base station 12 to broadcast as the first handover threshold a sixth signal strength value that is lower than the fifth signal-strength value.

Exemplary embodiments have been described above. Those skilled in the art will understand, however, that changes and modifications may be made to these embodiments without departing from the true scope and spirit of the invention.

We claim:

1. A computing system for dynamically configuring a particular base station to broadcast at least one setting for controlling handover to a preferred coverage frequency on which the particular base station does not operate, wherein the at least one setting includes a start-scanning threshold that defines downlink receive signal strength, from the particular base station, at which a device served by the particular base station will begin inter-frequency scanning, the computing system comprising:
   a processing unit;
   data storage; and
   program instructions stored in the data storage and executable by the processing unit to determine a configuration state of the network, to select, based on the determined configuration state, a signal strength value for the particular base station to broadcast as the start-scanning threshold, and to configure the particular base station to broadcast the selected signal strength value as the start-scanning threshold,
   wherein determining the configuration state of the network comprises making a determination, based on network configuration data, of which of at least the following three mutually exclusive configurations exists in the network:
      (A) there is at least one other base station that is located within a predefined threshold distance of the particular base station and that operates on the preferred coverage frequency,
      (B) there is no other base station that is located within the predefined threshold distance of the particular base station and that operates on the preferred coverage frequency, but there is at least one other base station that is a handover neighbor of the particular base station and that operates on the preferred coverage frequency, and
      (C) there is no other base station that is located within the predefined threshold distance of the particular base station and that operates on the preferred coverage frequency, and there no other base station that is a handover neighbor of the particular base station and that operates on the preferred coverage frequency,
   wherein selecting the signal strength value for the particular base station to broadcast as the start-scanning threshold comprises (i) if the determination is that configuration A exists in the network, then selecting as the start-scanning threshold a first signal strength value, (ii) if the determination is that configuration B exists in the network, then selecting as the start-scanning threshold a second signal strength value lower than the first signal strength value, and (iii) if the determination is that configuration C exists in the network, then selecting as the start-scanning threshold a third signal strength value lower than the second signal strength value.

2. The computing system of claim 1, wherein the computing system is part of the particular base station, and wherein configuring the particular base station to broadcast the selected signal strength value as the start-scanning threshold comprises setting the selected signal strength value as the start-scanning threshold in a system information message that the particular base station periodically broadcasts.

3. The computing system of claim 1, wherein the computing system is remote from the particular base station but is in network communication with the particular base station, and wherein configuring the particular base station to broadcast the selected signal strength value as the start-scanning threshold comprises transmitting from the computing system to the particular base station a control signal that directs the particular base station to include the selected signal strength value as the start-scanning threshold in a system information message that the particular base station periodically broadcasts.

4. The computing system of claim 1, wherein the preferred coverage frequency is a particular frequency band.

5. The computing system of claim 1, wherein making the determination comprises determining from the network configuration data whether there is at least one other base station that is located within the predefined threshold distance of the particular base station and that operates on the preferred coverage frequency.

6. The computing system of claim 5, wherein the network configuration data comprises data that specifies locations of base stations and coverage frequencies of base stations.

7. The computing system of claim 5, wherein a base station co-located with the particular base station is within the predefined threshold distance of the particular base station.

8. The computing system of claim 1, wherein making the determination comprises determining from network configuration data whether there is at least one other base station that is a handover neighbor of the particular base station and that operates on the preferred coverage frequency.

9. The computing system of claim 8,
   wherein the network configuration data comprises a neighbor list that specifies handover neighbors of the particular base station and that specifies, for each handover neighbor, a coverage frequency on which the handover neighbor operates, and
   wherein determining from the network configuration data whether there is at least one other base station that is a handover neighbor of the particular base station and that operates on the preferred coverage frequency comprises referring to the neighbor list to determine whether there is at least one other base station that is a handover neighbor of the particular base station and that operates on the preferred coverage frequency.

10. The computing system of claim 9, wherein the neighbor list is a neighbor list for the particular base station.

11. In a wireless communication network, a method of dynamically configuring a particular base station to broadcast at least one setting for controlling handover to a preferred coverage frequency on which the particular base station does not operate, wherein the at least one setting includes a start-scanning threshold that defines downlink receive signal strength, from the particular base station, at which a device served by the particular base station will begin inter-frequency scanning, the method comprising:
 making a determination, by a computing system, based on an evaluation of network configuration data, of which one of the following three configurations exists in the network:
  (A) there is at least one other base station that is located within a predefined threshold distance of the particular base station and that operates on the preferred coverage frequency,
  (B) there is no other base station that is located within the predefined threshold distance of the particular base station and that operates on the preferred coverage frequency, but there is at least one other base station that is a handover neighbor of the particular base station and that operates on the preferred coverage frequency, and
  (C) there is no other base station that is located within the predefined threshold distance of the particular base station and that operates on the preferred coverage frequency, and there no other base station that is a handover neighbor of the particular base station and that operates on the preferred coverage frequency; and
 if the determination is that configuration A exists in the network, then responsively configuring the particular base station, by the computing system, to broadcast as the start-scanning threshold a first signal strength value;
 if the determination is that configuration B exists in the network, then responsively configuring the particular base station, by the computing system, to broadcast as the start-scanning threshold a second signal strength value lower than the first signal strength value; and
 if the determination is that configuration C exists in the network, then responsively configuring the particular base station, by the computing system, to broadcast as the start-scanning threshold a third signal strength value lower than the second signal strength value.

12. A method of dynamically configuring a particular base station to broadcast at least one setting for controlling handover to a preferred coverage frequency on which the particular base station does not operate, wherein the at least one setting includes a start-scanning threshold that defines downlink receive signal strength, from the particular base station, at which a device served by the particular base station will begin inter-frequency scanning, the method comprising:
 making a first determination of whether there is at least one other base station that is located within a predefined threshold distance of the particular base station and that operates on the preferred coverage frequency;
 if the first determination is positive, then responsively configuring the particular base station to broadcast as the start-scanning threshold a first signal strength value; and
 if the first determination is negative, then making a second determination of whether there is at least one other base station that is a handover neighbor of the particular base station and that operates on the preferred coverage frequency and (i) if the second determination is positive, then responsively configuring the particular base station to broadcast as the start-scanning threshold a second signal strength value that is lower than the first signal-strength value, and (ii) if the second determination is negative, then responsively configuring the particular base station to broadcast as the start-scanning threshold a third signal strength value that is lower than the second signal-strength value,
 wherein making the second determination comprises consulting neighbor list data that specifies neighbor relationships between base stations and that specifies operating coverage frequencies of base stations, and determining from the neighbor list data whether there is at least one other base station that neighbors the particular base station and that operates on the preferred coverage frequency.

13. The method of claim 12, wherein the preferred coverage frequency is a particular frequency band.

14. The method of claim 12, wherein making the first determination of whether there is a second base station that is within the predefined threshold distance of the particular base station and that operates on the preferred coverage frequency comprises:
 consulting location-data to determine locations of one or more other base stations, and
 determining whether a location of any of the one or more other base stations is within the predefined threshold distance of a location of the particular base station.

15. The method of claim 14, wherein a base station co-located with the particular base station is considered to be located within the predefined threshold distance of the particular base station.

16. The method of claim 12, wherein the neighbor list data comprises a neighbor list of the particular base station.

17. The method of claim 12, wherein the method is carried out in response to detecting a change to the neighbor list data.

18. The method of claim 12, carried out by a computing device in network communication with the particular base station,
 wherein configuring the particular base station to broadcast a signal strength value as the start-scanning threshold comprises transmitting from the computing device to the particular base station a control signal that directs the particular base station to include the signal strength value as the start-scanning threshold in system information message broadcast periodically by the particular base station.

19. The method of claim 12, wherein the at least one handover setting further includes a first handover threshold that defines a receive signal strength, from the particular base station, at which the device served by the particular base station will request handover to a sufficiently strong target base station, and wherein the method further comprises:
 if the first determination is positive, then responsively configuring the particular base station to broadcast as the first handover threshold a fourth signal strength value; and
 if the first determination is negative and the second determination is positive, then responsively configuring the particular base station to broadcast as the first handover threshold a fifth signal strength value that is lower than the fourth signal-strength value, and if the first determination is negative and the second determination is negative, then responsively configuring the particular base station to broadcast as the first handover threshold a sixth signal strength value that is lower than the fifth signal-strength value.

\* \* \* \* \*